United States Patent
Ferrara et al.

(10) Patent No.: US 11,855,492 B2
(45) Date of Patent: Dec. 26, 2023

(54) ROTOR FOR A ROTARY ELECTRIC MACHINE

(71) Applicant: FERRARI S.p.A., Modena (IT)

(72) Inventors: Davide Ferrara, Modena (IT); Paolo Faverzani, Modena (IT); Luca Poggio, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 17/878,323

(22) Filed: Aug. 1, 2022

(65) Prior Publication Data

US 2023/0051422 A1 Feb. 16, 2023

(30) Foreign Application Priority Data

Aug. 12, 2021 (IT) .......................... 102021000021815

(51) Int. Cl.
*H02K 1/27* (2022.01)
*H02K 1/2792* (2022.01)

(52) U.S. Cl.
CPC .................................. *H02K 1/2792* (2022.01)

(58) Field of Classification Search
CPC .......... H02K 1/2792; H02K 1/83; H02K 1/28; H02K 1/2706; H02K 1/272; H02K 1/2753; H02K 1/278; H02K 7/00; H02K 7/003
USPC ...................................... 310/156.55
See application file for complete search history.

(56) References Cited

U.S. PATENT DOCUMENTS

| | | | | |
|---|---|---|---|---|
| 2006/0226724 | A1* | 10/2006 | Cullen | H02K 1/278 310/156.31 |
| 2009/0315423 | A1* | 12/2009 | Suzuki | H02K 1/276 310/156.12 |
| 2015/0171675 | A1* | 6/2015 | Carrasco | H02K 1/30 29/596 |

(Continued)

FOREIGN PATENT DOCUMENTS

| | | | |
|---|---|---|---|
| CN | 201113592 Y | * 9/2008 | ........... H02K 1/2792 |
| CN | 102263448 A | 11/2011 | |

(Continued)

OTHER PUBLICATIONS

CN-201113592-Y Machine Translation (Year: 2008).*
Search Report for Italian Application No. 102021000021815 completed Apr. 14, 2022.

*Primary Examiner* — Quyen P Leung
*Assistant Examiner* — Masoud Vaziri
(74) *Attorney, Agent, or Firm* — CANTOR COLBURN LLP

(57) ABSTRACT

A rotor for a rotary electric machine and having: a plurality of permanent magnets, which are axially oriented and are arranged beside one another around a rotations axis so as to form a closed ring; a support cylinder, which has an outer surface, on which the permanent magnets rest, and a central cavity; and two half-shafts, which are independent of and separate from one another and are singularly inserted in opposite ends of the central cavity of the support cylinder so as to form one single block with the support cylinder. The permanent magnets are circumferentially arranged one following the other according to a Halbach array so as to nullify the magnetic field radially on the inside of the permanent magnets and so as to maximize the magnetic field radially on the outside of the permanent magnets.

16 Claims, 4 Drawing Sheets

(56) References Cited

U.S. PATENT DOCUMENTS

| | | |
|---|---|---|
| 2015/0318748 A1* | 11/2015 | Pukki ................ H02K 1/28 |
| | | 310/90 |
| 2017/0271934 A1 | 9/2017 | Creedon et al. |
| 2019/0288579 A1 | 9/2019 | Magri et al. |
| 2020/0036246 A1 | 1/2020 | Saban et al. |
| 2021/0129709 A1 | 5/2021 | Lee et al. |
| 2021/0242741 A1 | 8/2021 | Ferrara et al. |

FOREIGN PATENT DOCUMENTS

| | | | |
|---|---|---|---|
| DE | 102006047186 A1 | 4/2008 | |
| DE | 102011012429 A1 | 8/2012 | |
| EP | 1892512 A2 | 2/2008 | |
| EP | 2069180 B1 | 5/2011 | |
| RU | 2659796 C1 | 7/2018 | |
| WO | WO-2020242533 A1 * | 12/2020 | ........... H02K 1/2792 |

* cited by examiner

ROTOR FOR A ROTARY ELECTRIC MACHINE

CROSS-REFERENCE TO RELATED APPLICATIONS

This patent application claims priority from Italian patent application no. 102021000021815 filed on Aug. 12, 2021, the entire disclosure of which is incorporated herein by reference.

TECHNICAL SECTOR

The invention relates to a rotor for a rotary electric machine.

The invention finds advantageous application in a rotary electric machine for automotive powering, which is installed on board a vehicle and can be used as a motor (absorbing electrical energy and generating a mechanical torque) or as a generator (converting mechanical energy into electrical energy).

PRIOR ART

A rotary electric machine for automotive powering comprises a shaft, which is mounted in a rotary manner so as to rotate around a central rotation axis, a rotor, which generally has permanent magnets and is fitted to the shaft so as to rotate with the shaft, and a stator, which is arranged around the rotor so as to enclose, on the inside, the rotor.

Documents CN102263448A, DE102011012429A1, US2021129709A1, US2021242741A1, US2019288579A1, RU2659796C1, US2020036246A1, EP2069180B1, EP1892512B1 and US2017271934A1 describe some examples of rotor for a rotary electric machine.

DESCRIPTION OF THE INVENTION

The object of the invention is to provide a rotor for a rotary electric machine, which has a particularly small mass and rotational inertia.

According to the invention, there is provided a rotor for a rotary electric machine according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
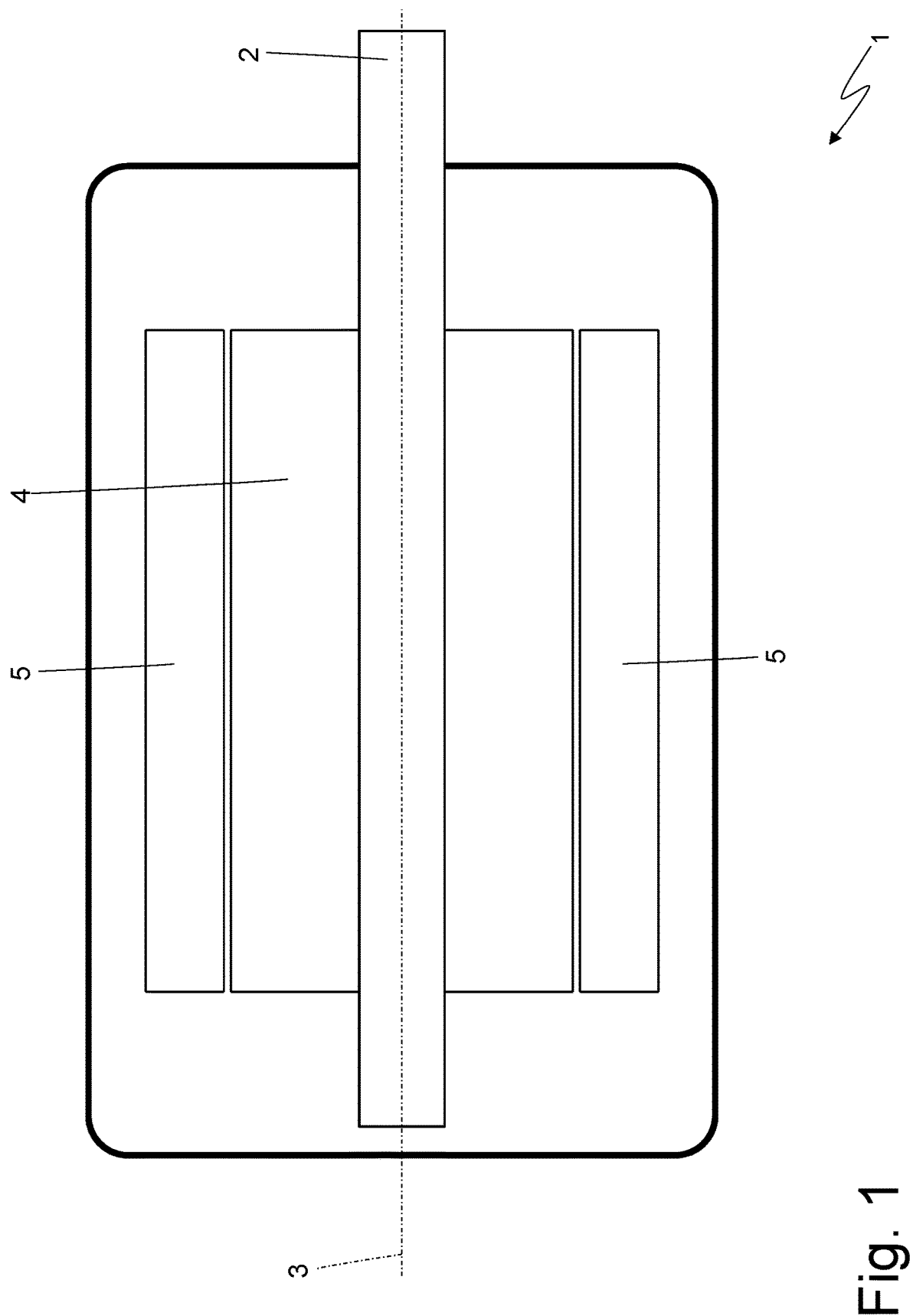
FIG. 1 is a schematic, longitudinal section view of a rotary electric machine provided with a rotor according to the invention.

In FIG. 1, number 1 indicates, as a whole, a synchronous electric machine for automotive powering, said electric machine being a reversible electric machine (i.e. an electric machine which can work both as an electric motor, absorbing electrical energy and generating a mechanical torque, and as an electric generator, absorbing mechanical energy and generating electrical energy).

The electric machine 1 is suited to be installed in an electric or hybrid drive vehicle comprising at least two drive wheels (namely, in a two-wheel-drive or four-wheel-drive electric or hybrid vehicle). In particular, the electric machine 1 can be connected to the drive wheels (directly or by means of a drivetrain possibly provided with a clutch); namely, between the electric machine 1 and the drive wheels there can be a direct connection, there can be a simple speed reducer or there can also be clutch.

The electric machine 1 comprises a shaft 2, which is mounted in a rotary manner so as to rotate around a central rotation axis 3, a rotor 4 with permanent magnets, which is fitted to the shaft 2 so as to rotate with the shaft 2, and a stator 5 with a tubular, cylindrical shape, which is arranged around the rotor 4 so as to enclose, on the inside, the rotor 4.

Between the rotor 4 and the stator 5 there is defined an air gap with an annular shape, which has a small thickness (normally, the bare minimum needed to allow the rotor 4 to rotate inside the stator 5 in total safety).

Figure 2:
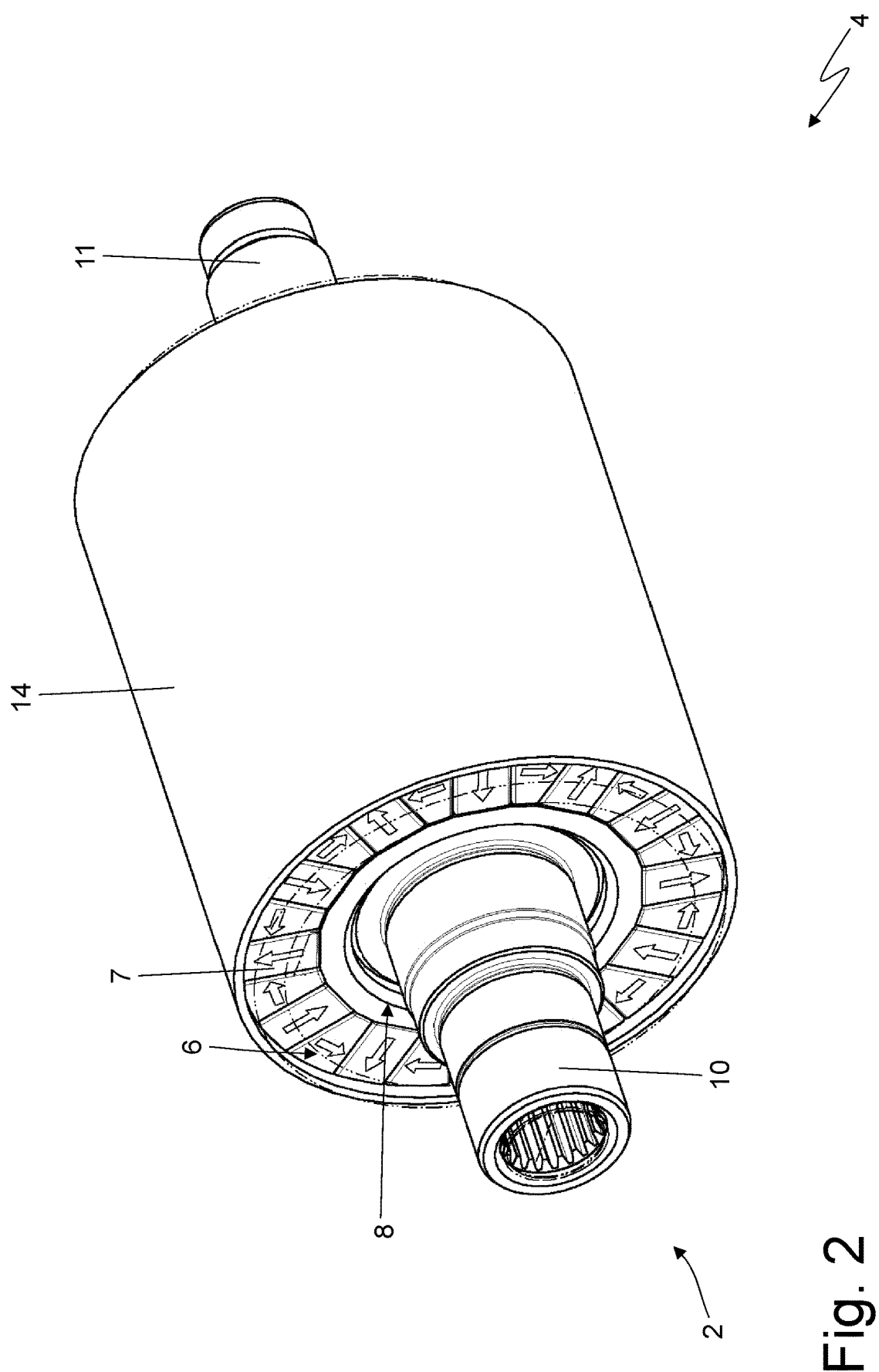
FIG. 2 is a perspective view of the rotor of FIG. 1 with some parts left out for greater clarity.
Figure 3:
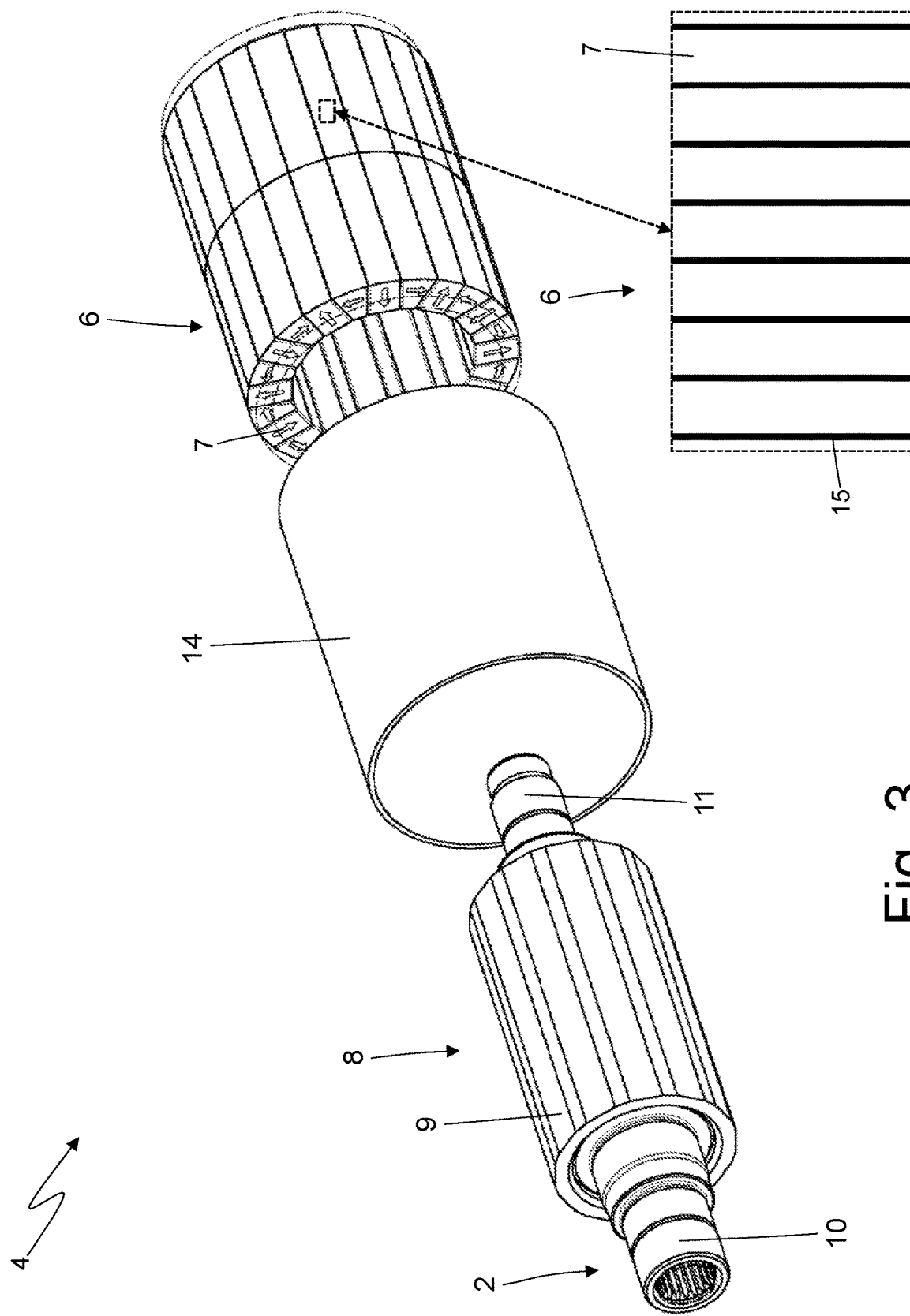
FIG. 3 is a perspective, exploded view of the rotor of FIG. 1 with some parts left out for greater clarity.

According to FIGS. 2 and 3, the rotor 4 comprises a plurality of permanent magnets 6, which are axially oriented and are arranged beside one another around the rotations axis 3 so as to form a closed ring. In the embodiment shown in FIG. 2 there are twenty-four permanent magnets 6 arranged so as to form a closed ring, but, according to other embodiments which are not shown herein, the total number of permanent magnet 6 could be different; for example, there could be four to thirty-two permanent magnets 6. The permanent magnets 6 have a superficial arrangement, namely they are arranged in the area of the outer surface of the rotor 4 and are not inserted in slots obtained in the rotor 4.

The succession of permanent magnets 6 building the closed ring entails a circumferential arrangement according to a Halbach array so as to nullify the magnetic field radially on the inside of the permanent magnets 6 and so as to maximize the magnetic field radially on the outside of the permanent magnets 6. In other words, the permanent magnets 6 are arranged so as to nullify the magnetic field radially on the inside of the permanent magnets 6 (towards the shaft 2) and so as to maximize the magnetic field radially on the outside of the permanent magnets 6 (towards the magnetic core of the stator 5). Namely, the permanent magnets 6 are circumferentially arranged one following the other according to a Halbach array so as to nullify the magnetic field radially on the inside of the permanent magnets 6 and so as to maximize the magnetic field radially on the outside of the permanent magnets 6.

A Halbach array is a special joining (arrangement) of the permanent magnets 6, which are arranged so as to augment the magnetic field on one side of the array (the radially outer side, in this embodiment) while cancelling (nullifying), through interference, the magnetic field on the opposite side (the radially inner side, in this embodiment). According to FIG. 2, the Halbach array entails cyclically repeating sets of four permanent magnets 6: a permanent magnet 6 having a South-North orientation circumferentially arranged in a clockwise direction, a following permanent magnet 6 having a South-North orientation radially arranged towards the outside (namely, moving away from the central rotation axis 3), a following permanent magnet 6 having a South-North orientation circumferentially arranged in a counterclockwise direction, and a following permanent magnet 6 having a South-North orientation radially arranged towards the inside (namely, moving close to the central rotation axis 3).

According to a different embodiment, the permanent magnets 6 are not arranged according to a Halbach array.

According to a preferred embodiment, each permanent magnet 6 is not monolith-like (namely, consisting—since the very beginning—of one single piece of undivided and indivisible magnetic material), but is formed by an axial succession of (smaller) permanent magnets 7 axially lined up one behind the other, namely each permanent magnet 6 consists of a plurality of (smaller) permanent magnets 7, which are axially arranged one after the other; in particular, in each permanent magnet 6 there generally are twenty to sixty permanent magnets 7 lined up one behind the other.

In each permanent magnet 6, all permanent magnets 7 making up the permanent magnet 6 have the same identical orientation, namely they are all equally oriented; in other words, in a same permanent magnet 6, the permanent magnets 7 making up the permanent magnet 6 are all oriented in the exact same manner.

In the embodiment shown in the accompanying figures, the permanent magnets 6 alternatively have a cross section with a rectangular shape and a cross section with the shape of an isosceles trapezium; according to a different embodiment which is not shown herein, the permanent magnets 6 all have the same cross section with the shape of an isosceles trapezium (obviously, with alternated orientations to build the ring).

Figure 4:
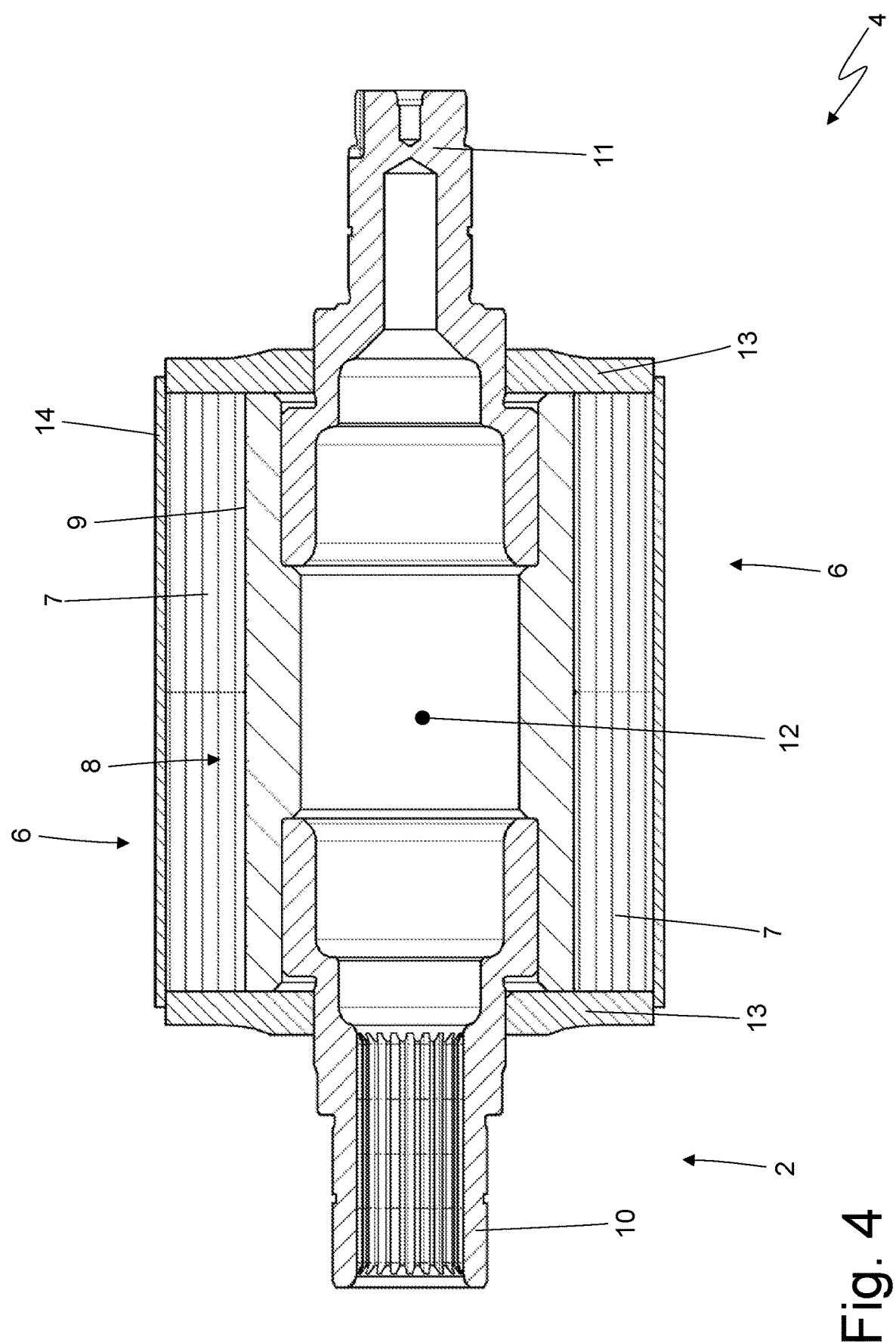
FIG. 4 is a longitudinal section view of the rotor of FIG. 1.

According to FIGS. 3 and 4, the rotor 4 comprises a support cylinder 8, which houses the permanent magnets 6; in particular, the support cylinder 8 has an outer surface 9, on which the permanent magnets 6 rest. According to a preferred embodiment, the outer surface 9 of the support cylinder 8 is faceted, namely consists of a plurality of flat surfaces, each providing a flat support for a corresponding permanent magnet 6. In other words, the permanent magnets 6 are superficially arranged on the outside of the support cylinder 8.

The support cylinder 8 is coupled (namely constrained so as to be angularly integral) to the shaft 2 so that they form, together, one single block. According to a preferred embodiment which is better shown in FIG. 4, the shaft 2 consists of two half-shafts 10 and 11, each separated from the other one and singularly coupled (fixed) to the support cylinder 8; namely, each half-shaft 10 or 11 is independent of and separate from the other half-shaft 10 or 11 and is coupled (fixed) to the support cylinder 8 independently of the other half-shaft 10 or 11. In particular, the support cylinder 8 is internally hollow and has a central through cavity 12, into which the two half-shafts 10 and 11 get inserted. According to a preferred embodiment, each half-shaft 10 or 11 is driven, through interference (in particular, by means of a hot-cold coupling to obtain a high fastening force), into the support cylinder 8 (namely, into the central cavity 12 of the support cylinder 8).

According to a preferred embodiment, inside the central cavity 12 of the support cylinder 8 and in the area of the two ends there are obtained two abutments, against which the corresponding half-shafts 10 and 11 rest; namely, the two abutments are limit stops for the insertion of the half-shafts 10 and 11 into the central cavity 12 of the support cylinder 8.

The half-shaft 10 is shaped so as to be mounted on a support bearing; furthermore, the half-shaft 10 is also shaped so as to be connected to a transmission of motion and, therefore, has a splined machining. On the other hand, the half-shaft 11 is shaped so as to be mounted on another support bearing; furthermore, the half-shaft 11 is also shaped so as to be connected to an angular position sensor (in particular, to a resolver).

According to FIG. 8, the rotor 4 comprises a pair of end discs 13, which are arranged around the shaft 2 at the two opposite ends of the support cylinder 8 and are designed (among other things) to hold the permanent magnets 6 packed together. In other words, the two end discs 13 make up the two opposite ends of the rotor 4 and keep the permanent magnets 6 axially compressed, so as to hold the permanent magnets 6 packed together.

According to a possible embodiment, the end discs 13 are designed to have balancing openings (not shown herein), which balance the rotor 4 around the rotation axis 3 and are manufactured by means of cylindrical drilling or by means of milling. In order to allow the rotor 4 to operate at high rotation speeds, ensuring, at the same time, a long operating life, the vibrations generated during the operation, which must be absorbed by the bearings supporting the shaft 2, need to be minimized. To this aim, the rotor 4 often needs to be balanced so as to reduce unbalances (due to unavoidable constructive tolerances), which generate vibrations during the rotation. In order to allow the rotor 4 to be balanced, the two end discs 13 are used, which act as balancing elements thanks to calibrated asymmetries of their mass generated by the balancing openings (which can be dead openings or through openings and can be arranged in a radial or axial manner).

The presence, the number, the arrangement and the depth of the balancing holes obviously are absolutely random and they can completely change from rotor 4 to rotor 4, as they depend on the actual unbalance (due to constructive tolerances) of the rotor 4 at the end of its manufacturing process. Theoretically speaking, a rotor 4 can be completely free from balancing holes, as, for a lucky combination of constructive tolerances, at the end its manufacturing process it is merely affected by an unbalance around the rotation axis 3 that is so small that it does not require corrections.

Each end disc 13 is fitted around a corresponding half-shaft 10 or 11 and is driven onto the half-shaft 10 or 11 through interference, namely each end disc 13 has, at the centre, a through hole where a corresponding half-shaft 10 or 11 is inserted (by means of an interference coupling).

The end discs 13 axially strike against the support cylinder 8; namely, the end discs 13 axially "touch" the support cylinder 8 and not the permanent magnets 6 so as to axially press directly against the support cylinder 8, instead of pressing against the permanent magnets 6. For this reason, the support cylinder 8 is axially longer (slightly longer, actually by a few millimetres) than the permanent magnets 6 so as to come into contact with the end discs 13 before the permanent magnets 6. According to an alternative embodiment, which is not part of the invention, the end discs 13 axially strike against the permanent magnets 6 so as to hold the permanent magnets 6 packed together; namely, the end discs 13 axially "touch" the permanent magnets 6 and not the support cylinder 8 so as to axially press directly against the permanent magnets 6, instead of pressing against the support cylinder 8. For this reason, the permanent magnets 6 are axially longer (slightly longer, actually by a few millimetres) than the support cylinder 8 so as to come into contact with the end discs 13 before the support cylinder 8.

The rotor 4 comprises a cylindrical containing element 14 (better shown in FIG. 3), which is internally hollow and is arranged around the permanent magnets 6 so as to hold the permanent magnets 6 in contact with the support cylinder 8;

namely, the containing element 14 covers the permanent magnets 6 on the outside so as to provide a radial containing of the permanent magnets 6 in order to prevent a centrifugal force from pushing the permanent magnets 6 against the magnetic core of the stator 5. According to a preferred embodiment, the containing element 14 consists of a tubular element of made of a composite material, which is driven around the permanent magnets 6 through interference. Alternatively, the containing element 14 is made of a plastic material, a light, non-ferromagnetic metal material (for example, aluminium, titanium or magnesium) or a ferromagnetic metal material. As further alternative, the containing element 14 consist of a resin-bonded filament wound in a spiral around the permanent magnets 6.

According to a possible embodiment, the containing element 14 is consists of one single monolith-like piece (namely, without gaps). Alternatively, the containing element 14 consists of two or more pieces, which are separate from and independent of one another and are arranged beside one another; in this embodiment, the different pieces making up the containing element 14 are singularly fitted around the permanent magnets 6 reducing the overall force needed for the operation (which, as mentioned above, takes place with a given interference).

Generally speaking, the half-shaft 10 is made of high-resistance steel (or another equivalent material in terms of mechanical features), since it has to be able to transmits the torque generated or absorbed by the rotor 4; on the other hand, the half-shaft 11 is made of steel or another metal material having a smaller resistance than the steel of the half-shaft 10, since the half-shaft 11 does not transmit the torque generated or absorbed by the rotor 4.

The support cylinder 8 is made of a magnetic metal material (steel), of a non-magnetic material (such as, for example, aluminium, titanium or magnesium) or even of a non-metal material (typically, a composite material, such as carbon fibre, in order to have the necessary resistance). As mentioned above, the magnetic field inside the permanent magnets 6 is null due to the Halbach array of the permanent magnets 6 and, therefore, the support cylinder 8 is not affected by a significant magnetic field; as a consequence, the support cylinder 8 does not necessarily need to have ferromagnetic properties. The support cylinder 8 made of a magnetic metal material simplifies the assembly of the rotor, since the permanent magnets 6 adhere, through magnetic attraction, to the outer surface 9 of the support cylinder 8 and, hence, during the assembly, they can more easily be arranged on the outer surface 9 of the support cylinder 8.

The end discs 13 are normally made of non-magnetic stainless steel so as to have the resistance needed to hold the permanent magnets 6 packed together and, at the same time, so as not to disturb the magnetic field generated by the permanent magnets 6.

According to a possible embodiment shown in FIG. 3, in each permanent magnet 6, the single permanent magnets 7 are glued to one another through the interposition of a mounting glue 15 (which is an electric insulator) so as to reduce power losses due to parasite currents. In other words, each permanent magnet 6 is obtained by gluing the single permanent magnets 7 to one another by means of the mounting glue 15 (which is an electric insulator).

According to a preferred embodiment, the permanent magnets 6 are directly mounted in the outer surface 9 of the support cylinder 8; in particular, each permanent magnet 6 is glued to the outer wall 9 of the support cylinder 8 by means of a mounting glue, which preferably is an electric insulator (so as to avoid "short-circuiting" the different permanent magnets 7 of a same permanent magnet 6 through the outer wall 9 of the support cylinder 8). In other words, between the outer wall 9 of the support cylinder 8 and the permanent magnet 6 there is interposed an electrically insulating layer built by the mounting glue.

The mounting glue has the function of electrically insulating the permanent magnets 6 from the outer wall 9 of the support cylinder 8 lying underneath and especially has the function of connecting the permanent magnets 6 to the outer wall 9 of the support cylinder 8 while building the rotor 4 (the mechanical holding of the permanent magnets 6 is ensured by the containing element 14, since the mounting glue is not capable of resisting a centrifugal force when the rotor 4 rotates at a high speed).

The embodiments described herein can be combined with one another, without for this reason going beyond the scope of protection of the invention.

The rotor 4 described above has numerous advantages.

First of all, the rotor 4 described above has both a small mass and a low rotational inertia, to the advantage of performances (in particular, the small rotational inertia reduces dynamic stresses on the entire drivetrain).

Furthermore, the rotor 4 described above uses innovative materials (in particular, composite materials), which ensure a performance-mass ratio that was never reached before. In particular, the rotor 4 described above uses different materials for the three main parts (support cylinder 8, half-shaft 10, half-shaft 11) making up the rotor 4; in this way, each main part (support cylinder 8, half-shaft 10, half-shaft 11) can be made of the material most suited to resist the mechanical stresses generated in use and to optimize the performance/mass ratio.

The rotor 4 described above ensures a high energy efficiency (namely, a high efficiency between the inputted mechanical or electrical power and the outputted electrical or mechanical power); to this regard, it should be pointed out that the presence of the containing element 14, for it ensures a high radial positioning and circularity precision, minimizes the air gap existing between the rotor 4 and the stator 5.

Finally, the rotor 4 described above is simple to be manufactured, as it consists of a small number of components with a simple shape, which can be quickly combined with one another even in automatic processes.

LIST OF THE REFERENCE NUMBERS OF THE FIGURES

1 electric machine
2 shaft
3 rotation axis
4 rotor
5 stator
6 permanent magnet columns
7 permanent magnets
8 support cylinder
9 outer surface
10 half-shaft
11 half-shaft
12 central cavity
13 end disc
14 containing element
15 mounting glue

The invention claimed is:

1. A rotor (4) for a rotary electric machine (1) and comprising:

a plurality of first permanent magnets (6), which are axially oriented and are arranged beside one another around a rotation axis (3) so as to form a closed ring;

a support cylinder (8), which has a central cavity (12) and an outer surface (9), on which the first permanent magnets (6) rest so that first permanent magnets (6) are superficially arranged on the outside of the support cylinder (8);

two half-shafts (10, 11), which are independent of and separate from one another and are singularly inserted in opposite ends of the central cavity (12) of the support cylinder (8) so as to form one single block with the support cylinder (8); and two end discs (13) are provided, which are arranged at the two opposite ends of the support cylinder (8) and are designed to hold the first permanent magnets (6) packed together; wherein the support cylinder (8) is axially longer than the first permanent magnets (6) so as to come into contact with the end disc (13) before the first permanent magnets (6), so that the end discs (13) axially strike against the support cylinder (8).

2. The rotor (4) according to claim 1, wherein each half-shaft (10, 11) is driven into the central cavity (12) of the support cylinder (8) through interference.

3. The rotor (4) according to claim 1, wherein inside the central cavity (12) of the support cylinder (8) and in the area of the two ends there are obtained two abutments, against which the corresponding half-shafts (10, 11) rest.

4. The rotor (4) according to claim 1, wherein:

a first half-shaft (10) is shaped so as to be mounted on a support bearing and has a machining that allows it to be connected to a transmission; and a second half-shaft (11) is shaped so as to be mounted on another support bearing and so as to be connected to an angular position sensor.

5. The rotor (4) according to claim 1, wherein the outer surface (9) of the support cylinder (8) is faceted, consists of a plurality of flat surfaces, each providing a flat support for a corresponding first permanent magnet (6).

6. The rotor (4) according to one of the claim 1, wherein each end disc (13) is fitted around a corresponding half-shaft (10, 11) and is driven onto the half-shaft (10, 11) through interference.

7. The rotor (4) according to claim 1 and comprising a cylindrical containing element (14), which is internally hollow and is arranged around the first permanent magnets (6) so as to hold the first permanent magnets (6) in contact with the support cylinder (8).

8. The rotor (4) according to claim 7, wherein the containing element (14) is made of a non-magnetic material.

9. The rotor (4) according to claim 7, wherein the containing element (14) consists of different pieces, which are separate from and independent on one another and are arranged beside one another.

10. The rotor (4) according to claim 7, wherein the containing element (14) is fitted around the first permanent magnets (6) through interference.

11. The rotor (4) according to claim 1, wherein a first half-shaft (10) is made of a different material than a material making up the second half-shaft (11).

12. The rotor (4) according to claim 1, wherein the support cylinder (8) is made of a different material than the materials making up the two half-shafts (10, 11).

13. The rotor (4) according to claim 1, wherein the support cylinder (8) is made of carbon fibre.

14. The rotor (4) according to claim 1, wherein the first permanent magnets (6) are directly glued on the outer surface (9) of the support cylinder (8) through the interposition of a mounting glue.

15. The rotor (4) according to claim 1, wherein the first permanent magnets (6) are circumferentially arranged one following the other according to a Halbach array so as to nullify the magnetic field radially on the inside of the permanent magnets (6) and so as to maximize the magnetic field radially on the outside of the permanent magnets (6).

16. The rotor (4) according to claim 15, wherein the Halbach array entails cyclically repeating sets of four first permanent magnets (6): a first permanent magnet (6) having a South-North orientation circumferentially arranged in a clockwise direction, a following first permanent magnet (6) having a South-North orientation radially arranged towards the outside, a following first permanent magnet (6) having a South-North orientation circumferentially arranged in a counterclockwise direction, and a following first permanent magnet (6) having a South-North orientation radially arranged towards the inside.

\* \* \* \* \*